(12) United States Patent
Salah et al.

(10) Patent No.: US 11,523,291 B2
(45) Date of Patent: Dec. 6, 2022

(54) PDCCH MONITORING SPAN ENHANCEMENT IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 4 days.

(21) Appl. No.: 16/864,158

(22) Filed: May 1, 2020

(65) Prior Publication Data
US 2020/0351681 A1 Nov. 5, 2020

Related U.S. Application Data

(60) Provisional application No. 62/842,626, filed on May 3, 2019.

(51) Int. Cl.
| | |
|---|---|
| *H04W 72/04* | (2009.01) |
| *H04W 24/08* | (2009.01) |
| *H04W 8/24* | (2009.01) |
| *H04W 76/27* | (2018.01) |
| *H04L 5/00* | (2006.01) |
| *H04L 27/26* | (2006.01) |

(52) U.S. Cl.
CPC ........... *H04W 24/08* (2013.01); *H04L 5/0007* (2013.01); *H04L 5/0094* (2013.01); *H04L 27/2605* (2013.01); *H04W 8/24* (2013.01); *H04W 72/042* (2013.01); *H04W 72/0446* (2013.01); *H04W 76/27* (2018.02)

(58) Field of Classification Search
CPC ....... H04W 8/24; H04W 24/08; H04W 72/04; H04W 72/0446; H04W 76/27; H04L 5/0007; H04L 5/0049; H04L 27/2605
See application file for complete search history.

(56) References Cited

U.S. PATENT DOCUMENTS

2019/0132857 A1  5/2019  Babaei et al.

FOREIGN PATENT DOCUMENTS

| | | |
|---|---|---|
| CN | 101925155 A | 12/2010 |
| CN | 109152054 A | 1/2019 |

OTHER PUBLICATIONS

Nokia et al., On PDCCH Enhancements for NR URLLC, 3GPP TSG RAN WG1 Meeting #96bis, R1-1904827, Xi'an, China, Apr. 8-12, 2019 (Year: 2019).*

(Continued)

*Primary Examiner* — Brian P Cox
(74) *Attorney, Agent, or Firm* — Han IP PLLC; Andy M. Han

(57) ABSTRACT

An apparatus, implemented in a user equipment (UE), transmits a report of a per-span based capability of the UE to a network node of a wireless network. The apparatus also performs physical downlink control channel (PDCCH) monitoring using a configuration that satisfies a requirement for a gap separation with respect to spans for at least one candidate value set in the report in every slot including cross-slot boundaries.

8 Claims, 7 Drawing Sheets

(56) References Cited

OTHER PUBLICATIONS

China National Intellectual Property Administration, International Search Report and Written Opinion for PCT/CN2020/088701, dated Jul. 29, 2020.
Intel Corporation, On PDCCH enhancements for eURLLC, 3GPP TSG RAN WG1 #96bis, R1-1904305, Xi'an, China, Apr. 8-12, 2019.
Huawei, Summary of 7.2.6.1 PDCCH enhancements, 3GPP TSG RAN WG1 Meeting #96bis, R1-1905740, i'an, China, Apr. 8-12, 2019.
Ericsson, PDCCH Enhancements for NR URLLC, 3GPP TSG-RAN WG1 Meeting #99, R1-1911945, Reno, USA, Nov. 18-22, 2019.

* cited by examiner

500

| | X | Y | M | N |
|---|---|---|---|---|
| CASE 1 | 1 | 1 | | |
| CASE 2 | 2 | 1 | | |
| CASE 3 | 2 | 2 | | |
| CASE 4 | 4 | 1 | | |
| CASE 5 | 4 | 2 | | |
| CASE 6 | 4 | 3 | | |
| CASE 7 | 7 | 1 | | |
| CASE 8 | 7 | 2 | | |
| CASE 9 | 7 | 3 | | |

NOTE: OTHER CASES ARE NOT PRECLUDED

FIG. 5

PDCCH MONITORING SPAN ENHANCEMENT IN MOBILE COMMUNICATIONS

CROSS REFERENCE TO RELATED PATENT APPLICATION

The present disclosure is part of a non-provisional patent application claiming the priority benefit of U.S. Provisional Patent Application No. 62/842,626, filed on 3 May 2019, the content of which being incorporated by reference in its entirety.

TECHNICAL FIELD

The present disclosure is generally related to mobile communications and, more particularly, to enhancement of physical downlink control channel (PDCCH) monitoring span in mobile communications.

BACKGROUND

Unless otherwise indicated herein, approaches described in this section are not prior art to the claims listed below and are not admitted as prior art by inclusion in this section.

In Release 15 (Rel-15) of the 3$^{rd}$ Generation Partnership Project (3GPP) technical specification for New Radio (NR), two PDCCH monitoring cases have been defined. In a first case (Case 1), a PDCCH monitoring periodicity of 14 or more symbols has been defined. More specifically, in Case 1-1, PDCCH monitoring can be on up to three orthogonal frequency-division multiplexing (OFDM) symbols at the beginning of a slot and, in Case 1-2, PDCCH monitoring can be on any span of up to three consecutive OFDM symbols of a slot. For a given user equipment (UE), all search space configurations are within the same span of three consecutive OFDM symbols in the slot. In a second case (Case 2), a PDCCH monitoring periodicity of less than 14 symbols has been defined. This includes the PDCCH monitoring of up to three OFDM symbols at the beginning of a slot. The support of Case 2 is necessary to enable PDCCH monitoring within the slot and to allow for low-latency scheduling for ultra-reliable low-latency communication (URLLC).

In Rel-15, budgets of the number of control channel elements (#CCE) blind decodes (#BD) were defined on a per-slot basis for different numerologies. In Release 16 (Rel-16) of the 3GPP technical specification for NR, an increased PDCCH monitoring capability (with respect to the maximum number of non-overlapped CCEs and BDs per slot) is needed. Increased PDCCH monitoring capability leads to reduced latency and improvement in PDCCH blocking. However, increase PDCCH monitoring capability tends to result in increased UE complexity and power consumption. Thus, there is a need for a PDCCH monitoring design in Rel-16, to avoid or otherwise mitigate the compromise on UE complexity and power consumption, by taking into account the increase in the #CCEs #BDs budgets and distribution of the budgets to limit UE complexity.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to enhancement of PDCCH monitoring span in mobile communications.

In one aspect, a method may involve a processor of an apparatus, implemented in a UE, transmitting a report of a per-span based capability of the UE to a network node of a wireless network. The method may also involve the processor performing PDCCH monitoring using a configuration that satisfies a requirement for a gap separation with respect to spans for at least one candidate value set in the report in every slot including cross-slot boundaries.

In one aspect, an apparatus implementable in a UE may include a transceiver and a processor coupled to the transceiver. The transceiver may be configured to communicate with a network node of a wireless network. The processor may transmit, via the transceiver, a report of a per-span based capability of the UE to a network node of a wireless network. The processor may also perform, via the transceiver, PDCCH monitoring using a configuration that satisfies a requirement for a gap separation with respect to spans for at least one candidate value set in the report in every slot including cross-slot boundaries.

It is noteworthy that, although description provided herein may be in the context of certain radio access technologies, networks and network topologies such as 5th Generation (5G)/NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 5 is a diagram of an example scenario in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhancement of PDCCH monitoring span in mobile communications. According to the present disclosure, a number of possible solutions may be implemented separately or jointly. That is, although these possible solutions may be described below separately, two or more of these possible solutions may be implemented in one combination or another.

Figure 1:
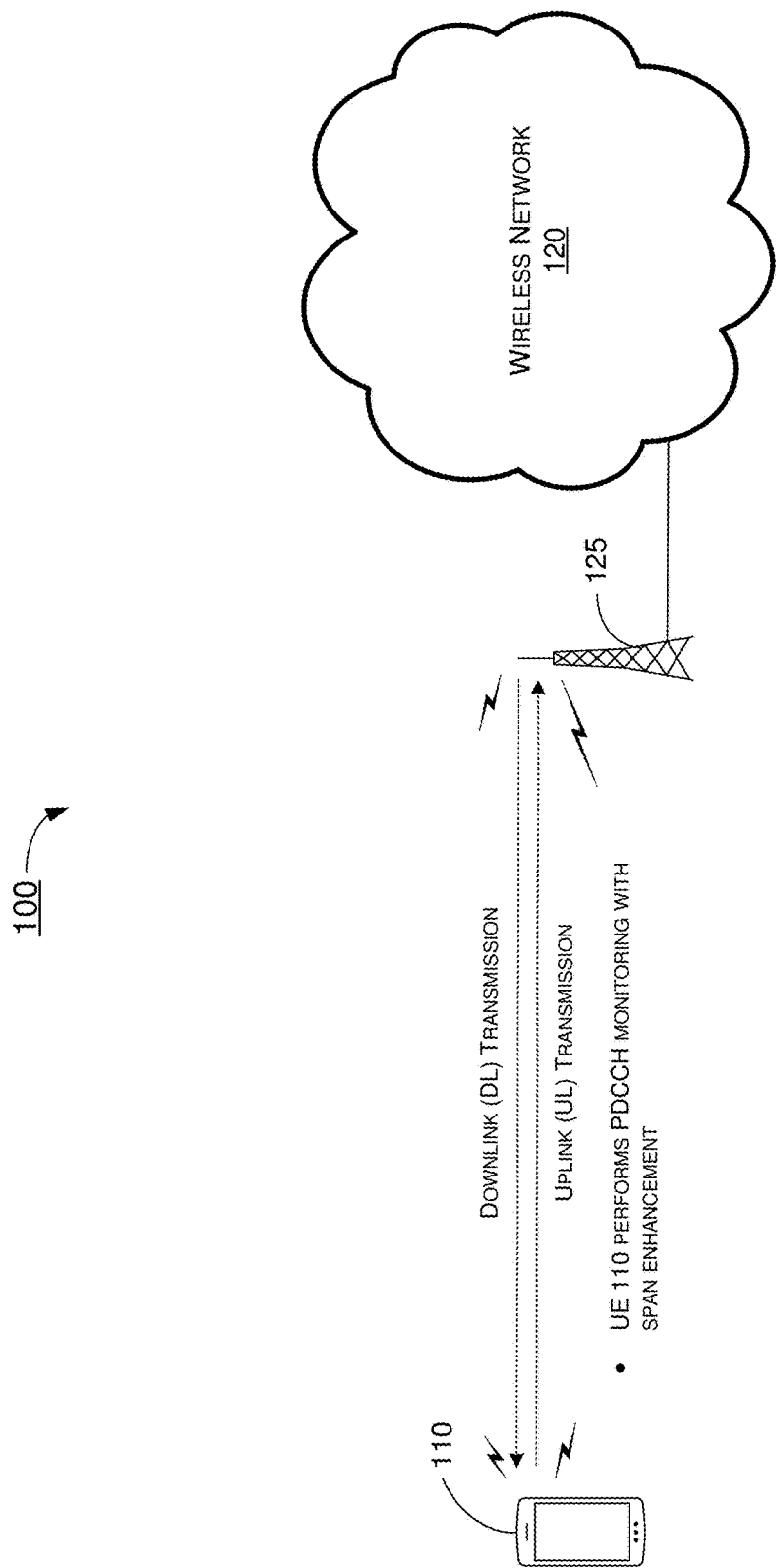
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2, FIG. 3, FIG. 4 and FIG. 5 illustrate example scenarios 200, 300, 400 and 500, respectively, in accordance with implementations of the present disclosure. Each of scenarios 200, 300, 400 and 500 may be implemented in network environment 100. The following description of various proposed schemes is provided with reference to FIG. 1~FIG. 5.

Referring to FIG. 1, network environment 100 may involve a UE 110 in wireless communication with a wireless network 120 (e.g., a 5G NR mobile network). UE 110 may be in wireless communication with wireless network 120 via a base station or network node 125 (e.g., an eNB, gNB or transmit-receive point (TRP)) and perform operations to achieve enhancement of PDCCH monitoring span in mobile communications based on any of the proposed schemes in accordance with the present disclosure, as described herein.

In Rel-15, the maximum number of non-overlapped CCEs and BDs is specified per slot. An increased PDCCH monitoring capability on the number of non-overlapped CCEs was adopted in Rel-16 for better latency. Explicit limitation on the maximum number of non-overlapped CCEs is per monitoring span. That is, the limitation on the number of non-overlapped CCEs is per slot for Rel-15 and per span for Rel-16. The Rel-15 Feature 3-5b defining the monitoring span is used for the explicit limitation. Monitoring spans (2, 2), (4, 3), (7, 3) defined in UE feature 3-5b constitute the (X, Y) combinations adopted for Rel-16 PDCCH monitoring capability on the per-component carrier (CC) limit on the maximum number of non-overlapping CCEs. The per-CC limit on the maximum number of non-overlapping CCEs for channel estimation per PDCCH monitoring span for a certain combination $(X, Y, \mu)$ is denoted as C. The value of C for combination (7, 3) for 15 kHz and 30 kHz is 56. The value of C for combination (4, 3) for 15 kHz and 30 kHz is yet to be defined. The value of C for combination (2, 2) for 15 kHz and 30 kHz is yet to be defined also. UE 110 may report the supported combinations per sub-carrier spacing (SCS) and/or per minimum processing capability.

Under the 3GPP, it has been agreed that support for increased PDCCH monitoring capability on at least the maximum number of non-overlapped CCEs per slot for channel estimation for Rel-16 NR URLLC for at least one SCS is subject to a number of restrictions. One restriction involves explicit limitation on the maximum number of BDs/non-overlapping CCEs per monitoring occasion and/or per monitoring span.

Generally, PDCCH monitoring occasion(s) can be any OFDM symbol(s) of a slot for Case 2. For any two PDCCH monitoring occasions belonging to different spans (in the same or different search space(s)) there is a minimum time separation of X OFDM symbols (including the cross-slot boundary case) between the start symbols of every two adjacent spans, with each span being of a length up to Y consecutive OFDM symbols of a slot. It is noteworthy that spans do not overlap and every span is contained in a single slot. The same span pattern repeats in every slot. Moreover, the separation between consecutive spans within and across slots may be unequal but the same (X, Y) limit need to be satisfied by all spans. Additionally, every PDCCH monitoring occasion is fully contained in one span.

In order to determine a suitable span pattern, firstly a bitmap $b(l)$, $0 \leq l \leq 13$, is generated in that $b(l)=1$, in case symbol l of any slot is part of a monitoring occasion, and $b(l)=0$ otherwise. The first span in the span pattern begins at the smallest l for which $b(l)=1$. The next span in the span pattern begins at the smallest l not included in the previous span(s) for which $b(l)=1$. The span duration is the maximum of the two values of (1) the maximum value of all control resource set (CORESET) durations and (2) the minimum value of Y in UE-reported candidate value(s) (which can be mathematically expressed as max{maximum value of all CORESET durations, minimum value of Y in UE-reported candidate value(s)}) except possibly the last span in a slot which can be of a shorter duration. Thus, a particular PDCCH monitoring configuration would meet the UE capability limitation if the span arrangement satisfies the gap separation for at least one (X, Y) in the UE-reported candidate value set in every slot, including cross-slot boundaries.

Figure 2:
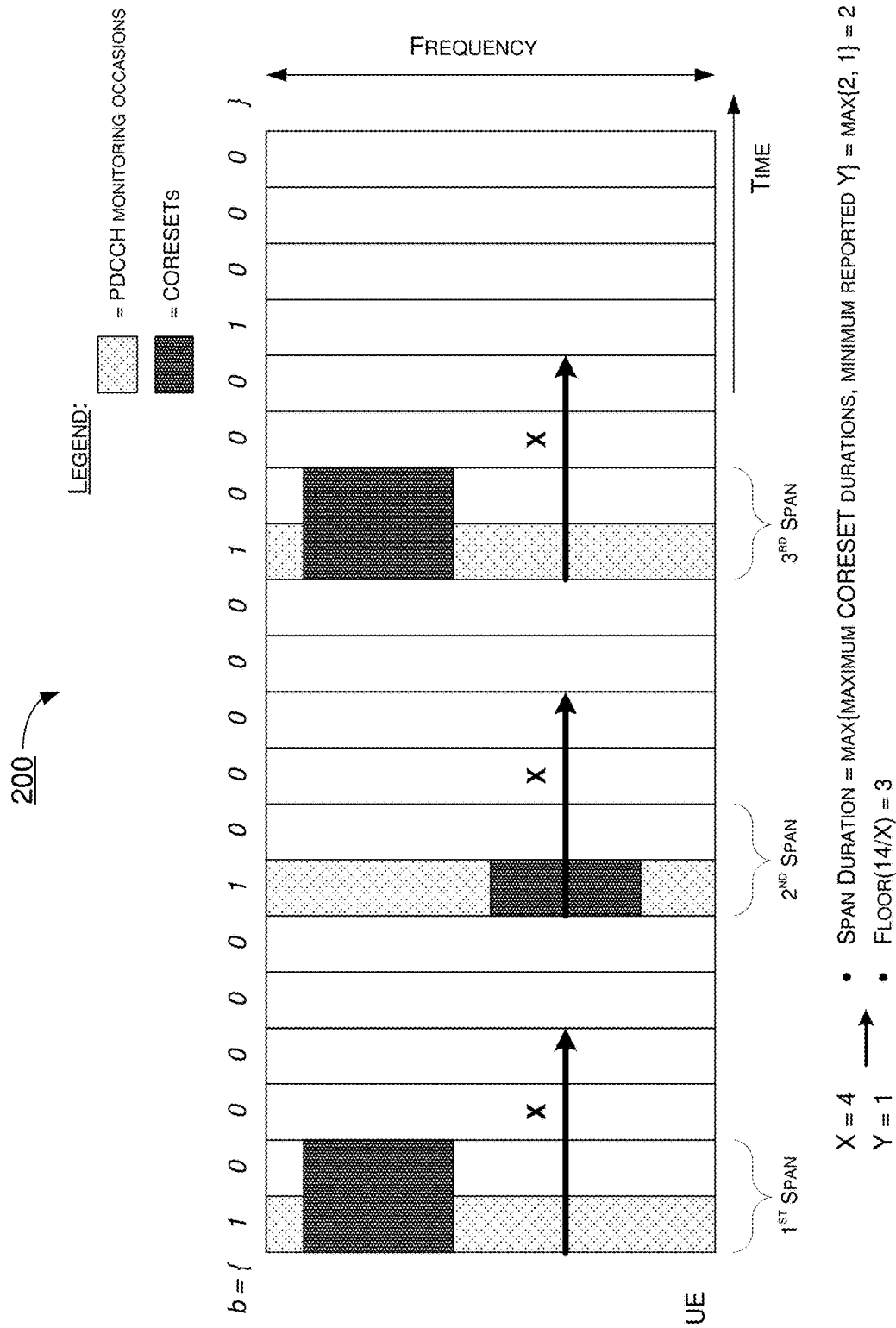
FIG. 2 is a diagram of an example scenario in accordance with an implementation of the present disclosure.
Figure 3:
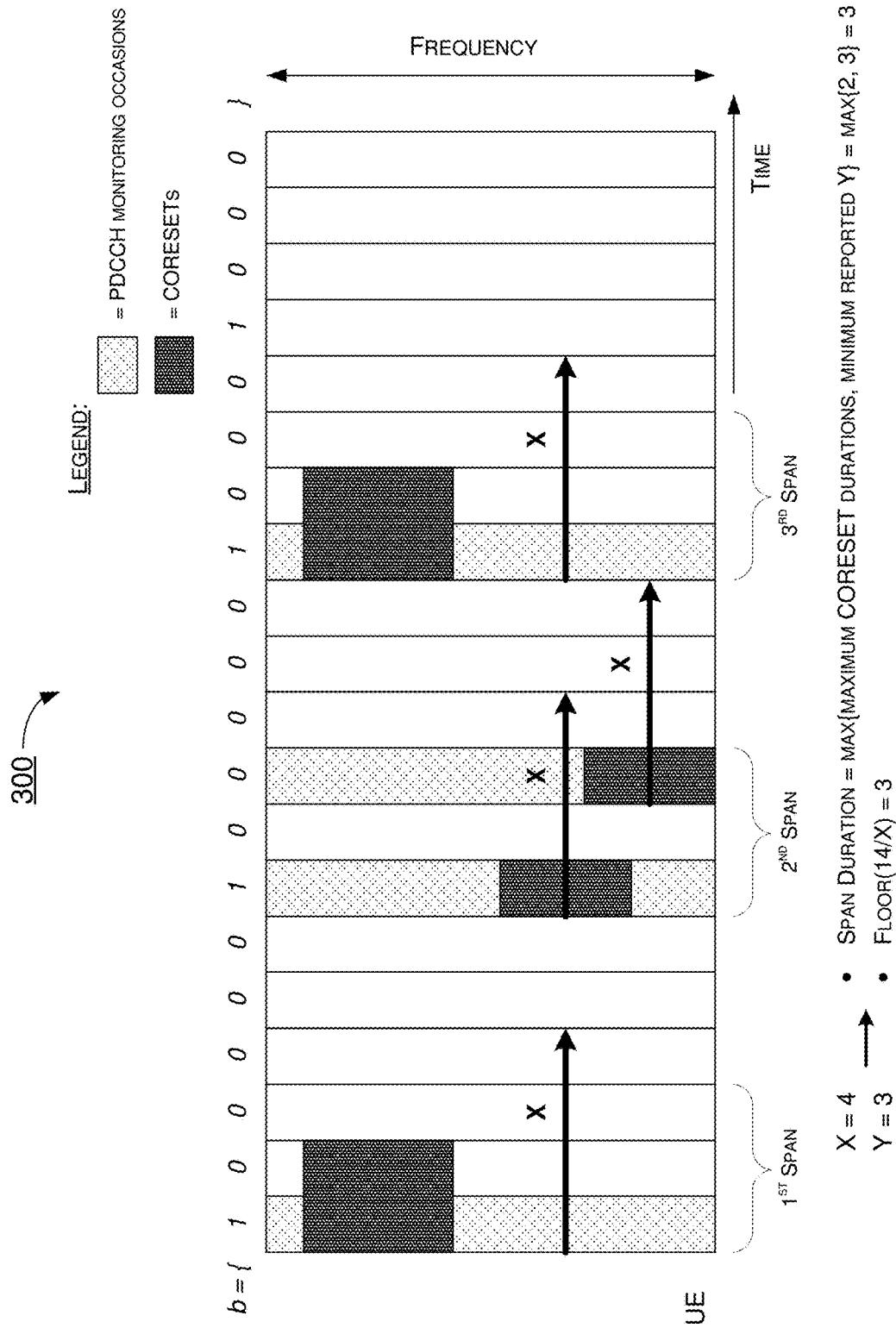
FIG. 3 is a diagram of an example scenario in accordance with an implementation of the present disclosure.

The number of different start symbol indices of spans for all PDCCH monitoring occasions per slot is no more than floor(14/X), where X is the minimum value among values reported by the UE with respect to a minimum separation or gap between the start symbols of every two adjacent spans in terms of number of OFDM symbols. The number of different start symbol indices of PDCCH monitoring occasions per slot including PDCCH monitoring occasions is no more than 7. The number of different start symbol indices of PDCCH monitoring occasions per half-slot including PDCCH monitoring occasions is no more than 4 in the secondary cell (SCell). FIG. 2 illustrates an example scenario 200 of PDCCH monitoring in accordance with an implementation of the present disclosure. In scenario 200, the maximum value of all CORESET durations is 2 and the minimum value of Y in the UE-reported candidate value is 1. Thus, for the (X, Y) candidate of (4, 1), the span duration may be expressed as span duration=max{max CORESET duration, minimum reported Y}=max{2, 1}=2. Also, in scenario 200, floor(14/X)=3. FIG. 3 illustrates an example scenario 300 of PDCCH monitoring in accordance with an implementation of the present disclosure. In scenario 300, the maximum value of all CORESET durations is 2 and the minimum value of Y in the UE-reported candidate value is 3. Thus, for the (X, Y) candidate of (4, 3), the span duration may be expressed as span duration=max{max CORESET duration, minimum reported Y}=max{2, 3}=3. Also, in scenario 200, floor(14/X)=3.

Under a proposed scheme in accordance with the present disclosure, a PDCCH monitoring span arrangement may meet UE capability limitation if the span arrangement satisfies the gap separation for at least one (X, Y) in the UE-reported candidate value set in every slot (C1, C2), including cross-slot boundaries. For example, C1=(4, 3, M1) and C2=(7, 3, M2). In this example, both C1 and C2 are valid configurations, and a single value of M needs to be selected under one of a number of options. Under a first option (Option 1), the value of M of the valid configuration with the largest X may be selected. In the above example, the largest X is 7 and corresponds to configuration C2 and, hence, M=M2. In an event that the largest X applies to multiple configurations, the value of Y may be used for selection (e.g., the largest or the smallest Y) or the largest M may be chosen. Under a second option (Option 2), the largest value of M of the valid configurations may be selected. Under a third option (Option 3), the value of M of the valid configuration with the lowest index may be selected.

Under a proposed scheme in accordance with the present disclosure, as in Rel-15 Feature 3-5b where (X, Y) is reported to a base station (e.g., network node 125), UE 110 may report (X, Y, M) where M is included in the UE report and M is the maximum number of non-overlapping CCEs for channel estimation per PDCCH monitoring span for a corresponding set of (X, Y). An explicit value of M may be reported or an alternative value that may be used to deduce the value of M (e.g., an index into a specified table for possible values of M). For instance, the possible values of M may be left to UE 110 to report based on its capabilities. A set of possible values of M may be specified and UE 110 may select a value to report in each UE-reported candidate (X, Y, M). Alternatively, or additionally, UE 110 may be radio resource control (RRC)-configured or dynamically configured with a set of possible values of M for selection. Alternatively, or additionally, the value of M may be specified but not explicitly reported by UE 110, and network node 125 may deduce the value of M (e.g., from the UE-reported candidate (X, Y)).

Figure 4:
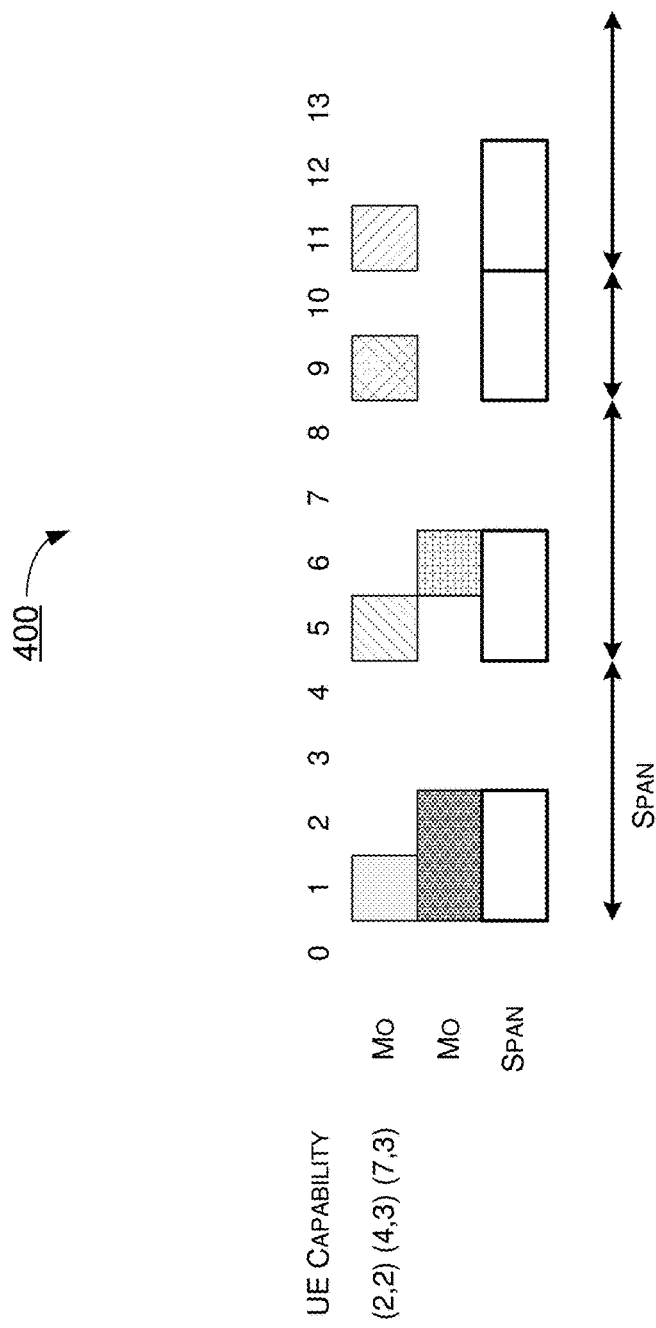
FIG. 4 is a diagram of an example scenario in accordance with an implementation of the present disclosure.

Under a proposed scheme in accordance with the present disclosure, another Mos may be defined per OFDM symbol and reported instead of M. In such cases, network node 125 may derive the value of M based on the Mos. For instance, one option to derive M may be expressed as M=max(valid X)×Mos. Another other to derive M may be expressed as M=Sj×Mos, where Sj denotes the separation between consecutive spans. Hence, a different value of M per monitoring span may result based on the separation to the next span. FIG. 4 illustrates an example scenario 400 in accordance with an implementation of the present disclosure. In scenario 400, different separations between consecutive spans are labeled as S1, S2, S3 and S4, which may be of different lengths in terms of number of OFDM symbols.

Under a proposed scheme in accordance with the present disclosure, multiple options may be considered to define UE behavior in an event that an obtained span monitoring configuration is invalid. For instance, when the condition on different start symbol indices of PDCCH monitoring occasions is no more than 7 is violated, multiple options may be considered to define behavior of UE 110. In one option, UE 110 may drop all the PDCCH monitoring configurations and consider it as an error case. UE 110 may not be expected to be configured with monitoring configurations leading to invalid span monitoring configuration. UE 110 may fall back to the monitoring configuration associated with CORESET 0. In another option, UE 110 may drop one or more configurations based on some priorities in an event that dropping one or more configurations could lead to a valid span monitoring configuration. Such priorities may include, for example and without limitation, search space index, service type (in case of physical layer awareness of service type associated with a monitoring configuration), density of monitoring occasions of each configuration, and smallest or largest monitoring gaps. In case that multiple dropping combinations are possible, some extra constraints to help down-select the possibilities may be introduced such as, for example and without limitation, search space index. Dropping one or more configurations may be done prior to the PDCCH overbooking check to avoid dropping rules conflict.

Under a proposed scheme in accordance with the present disclosure, multiple options may be considered to define UE behavior in an event that PDCCH monitoring configurations together lead to an invalid configuration. For instance, when the number of different start symbol indices of PDCCH monitoring occasions per slot is more than 7, multiple options may be considered to define behavior of UE 110. In one option, UE 110 may drop all the PDCCH monitoring configurations and consider it as an error case. UE 110 may not be expected to be configured with monitoring configurations leading to an invalid monitoring configuration. UE 110 may fall back to the monitoring configuration associated with CORESET 0. In another option, UE 110 may drop one or more configurations based on some priorities in an event that dropping one or more configurations could lead to a valid monitoring configuration. Such priorities may include, for example and without limitation, search space index, service type (in case of physical layer awareness of service type associated with a monitoring configuration), density of monitoring occasions of each configuration, and smallest or largest monitoring gaps. In case that multiple dropping combinations are possible, some extra constraints to help down-select the possibilities may be introduced such as, for example and without limitation, search space index.

Under a proposed scheme in accordance with the present disclosure, the maximum number of monitored PDCCH candidates (blind decodes, or #BDs) may be defined in a similar way as M (the maximum number of non-overlapping CCEs for channel estimation per PDCCH monitoring span) and may be denoted as N. Various aspects with respect to defining and reporting of M as described in the present disclosure may also be applied to the design of N (#BDs budget). FIG. 5 illustrates an example scenario 500 in accordance with an implementation of the present disclosure. In scenario 500, different values of M and N corresponding to different cases of (X, Y) may be defined in the table shown.

Under a proposed scheme in accordance with the present disclosure, as in Rel-15 Feature 3-5b where (X, Y) is reported to a gNB (e.g., network node 125), UE 110 may report (X, Y, M, N) where M and N are both included in the UE report. Here, M denotes the maximum number of non-overlapping CCEs per monitoring span defined by (X, Y) and N denotes the maximum number of BDs per monitoring span defined by (X, Y). Under the proposed scheme, explicit values of M and N may be reported or alternative value(s) that may be used to deduce the value(s) of M and N may be reported. For instance, an index into specified table(s) for possible values of M and/or N may be reported instead of explicit value(s) thereof. Alternatively, or additionally, possible values of M and N may be left to UE 110 to report based on its capabilities. Alternatively, or additionally, a set of possible values of M and/or N may be specified and UE 110 may select the values to report in each UE report candidate (X, Y, M, N). Alternatively, or additionally, UE 110 may be RRC or dynamically configured with the set of possible values of M and/or N for selection. Alternatively, or additionally, the values of M and N may be specified but not explicitly reported by UE 110 and, in such cases, network node 125 may deduce the value(s) of M and/or N (e.g., from the Rel-15 Feature 3-5b UE-reported candidate (X, Y)).

Under a proposed scheme in accordance with the present disclosure, multiple values of M and/or N may be defined per (X, Y) single candidate to allow for different numbers for different numerologies. Under the proposed scheme, multiple values of M and/or N may be defined per (X, Y) single candidate to allow for different numbers for different UE processing capabilities. For instance, two values of M and/or N may be specified for two capabilities of UE 110 (e.g., capability #1 and capability #2). Under the proposed scheme, the monitoring span design may be restricted to some numerologies (e.g., only for SCS=15 kHz or 30 kHz). Under the proposed scheme, in the monitoring span design table (e.g., the table in FIG. 3), some rows may be restricted to certain numerologies. Alternatively, one separate table per numerology may be defined.

Under a proposed scheme in accordance with the present disclosure, a PDCCH monitoring span arrangement may meet UE capability limitation if the span arrangement satisfies the gap separation for at least one (X, Y) in the UE-reported candidate value set in every slot (C1, C2), including cross-slot boundaries. For example, C1=(4, 3, M1, N1) and C2=(7, 3, M2, N2). In this example, both C1 and C2 are valid configurations, and a single value of M and/or N needs to be selected under one of a number of options. Under a first option (Option 1), the value of M and/or N of the valid configuration with the largest X may be selected. In the above example, the largest X is 7 and corresponds to configuration C2 and, hence, M=M2. In an event that the largest X applies to multiple configurations, the value of Y may be used for selection (e.g., the largest or the smallest Y) or the largest M and/or N may be chosen. Under a second option (Option 2), the largest value of M and/or N of the valid configurations may be selected. Under a third option (Option 3), the value of M and/or N of the valid configuration with the lowest index may be selected.

Under a proposed scheme in accordance with the present disclosure, the new design of PDCCH monitoring spans, the UE-reported (X, Y) candidate and a value of M of the limit on the maximum number of non-overlapping CCEs may be different from those according to the Rel-15 slot-based design. Under the proposed scheme, the selection of the new design may be done by RRC configuration. The new design may be defined as a UE capability and UE 110 may report the support of the new design to network node 125. Under the proposed scheme, two mechanisms may be defined. A first mechanism (Mechanism 1) may utilize new slot-based #CCEs and #BDs limits (similar to Rel-15 but with budgets increased), and it may be possible to define the budget per half-slot instead. A second mechanism (Mechanism 2) may involve monitoring span design with the UE reporting (X, Y, M) candidates. The two mechanisms may be defined as UE features/capabilities and UE 110 may report the support of such features. The two mechanisms may also be used together where Mechanism 1 may put a limit per slot and Mechanism 2 may be for the distribution of the budgets in the slot. Different numbers of maximum CCs to support Mechanism 1 and Mechanism 2 may be defined. Moreover, Mechanism 1 and/or Mechanism 2 may be restricted to primary cell (PCell) and secondary cell (SCell) or, alternatively, may be supported but as a UE capability.

Under a proposed scheme in accordance with the present disclosure, when Mechanism 1 and Mechanism 2 are used simultaneously, the #CCEs and #BDs budgets obtained from the two mechanisms may not be contradicting or some rules may be defined to allow the two mechanisms to co-exist. In one option, the condition (max non-overlapping #CCEs of Mechanism 2)≤(max non-overlapping #CCEs of Mechanism 1) may be verified. Here, "max non-overlapping #CCEs of Mechanism 1" denotes the maximum number of non-overlapping CCEs budgets per slot (or sub-slot), and "max non-overlapping #CCEs of Mechanism 2" denotes the maximum number of non-overlapping CCEs budgets per slot (or sub-slot) determined as M×Ns, where M is the maximum number of non-overlapping CCEs per span and Ns is the number of spans per slot (or sub-slot). In an event that the condition above is not verified, then one of the following may be implemented: (1) this may be considered as an error case, (2) the value of M (per monitoring span) may be capped as M≤(max non-overlapping #CCEs of Mechanism 1)/Ns, and (3) one of the two mechanisms may be selected.

In another option, the condition (max non-overlapping #CCEs of Mechanism 2)≤(max non-overlapping #CCEs of Mechanism 1) may be verified. Here, "max non-overlapping #CCEs of Mechanism 1" denotes the maximum number of non-overlapping CCEs budgets per slot (or sub-slot), and "max non-overlapping #CCEs of Mechanism 2" denotes the maximum number of non-overlapping CCEs budgets per slot (or sub-slot) determined as M×Ns, where M is the maximum number of non-overlapping CCEs per span and Ns is the number of spans per slot (or sub-slot). In an event that the condition above is not verified, then one of the following may be implemented: (1) this may be considered as an error case, (2) the value of M (per monitoring span) may be capped as M≤(max non-overlapping #CCEs of Mechanism 1)/Ns, and (3) one of the two mechanisms may be selected.

Another option for the case when Mechanism 1 and Mechanism 2 are used simultaneously may be o restrict Mechanism 1 to some configuration(s) and Mechanism 2 to some different configuration(s). For instance, Mechanism 1 may be restricted to PDCCH monitoring configuration with a single span/monitoring occasion and Mechanism 2 if multiple monitoring spans are needed. In such a case the reported M may possibly be ignored. A further option may be to allow this behavior and consider UE 110 to be capable to support Mechanism 2 with higher capabilities then specified in Mechanism 1. This may be defined as a UE feature or a UE capability. Mechanism 1 or Mechanism 2 (or a combination of both) may be used for the overbooking dropping rules.

Under a proposed scheme in accordance with the present disclosure, with respect to the number of PDCCH monitoring spans per slot, increased or decreased number of monitoring spans per slot may be taken into account to scale up or down the budget M. With increased number of spans, some scheduling restrictions may be included such as, for example and without limitation, reduced number of resource blocks (RBs), number of spatial layers, and transport block size (TBS).

Illustrative Implementations

Figure 6:
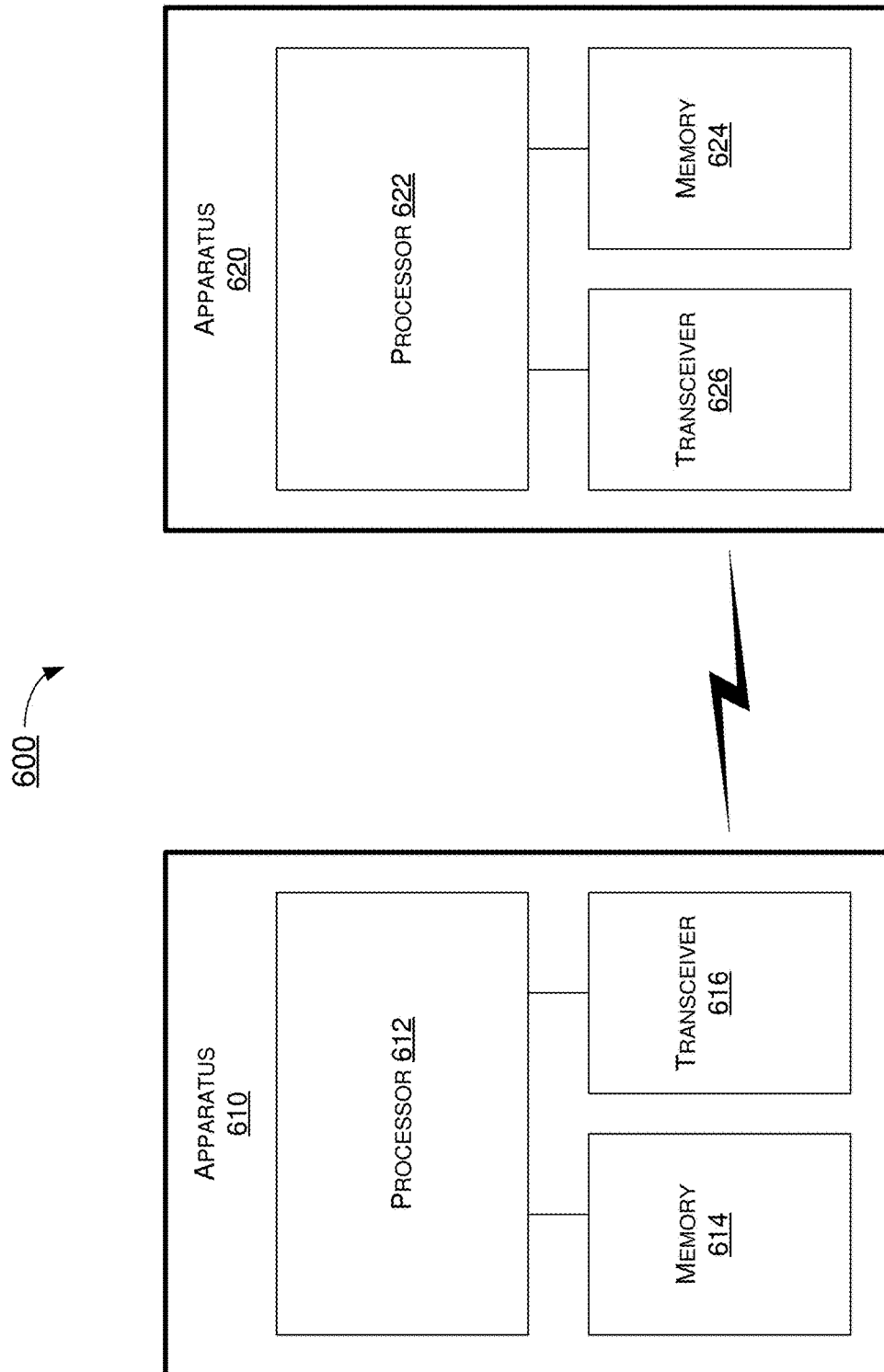
FIG. 6 is a block diagram of an example communication system in accordance with an implementation of the present disclosure.

FIG. 6 illustrates an example system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to enhancement of PDCCH monitoring span in mobile communications, including the various schemes described above with respect to various proposed designs, concepts, schemes, systems and methods described above as well as processes described below. For instance, apparatus 610 may be an example implementation of UE 110, and apparatus 620 may be an example implementation of network node 125.

Each of apparatus 610 and apparatus 620 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 610 and apparatus 620 may be implemented in a smartphone, a smart watch, a personal digital assistant, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in a network node (e.g., network node 125), such as an eNB in an LTE, LTE-Advanced or LTE-Advanced Pro network or in a gNB or TRP in a 5G network, an NR network or an IoT network.

In some implementations, each of apparatus 610 and apparatus 620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 610 and apparatus 620 may be implemented in or as a network apparatus or a UE. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, one or more RISC processors or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to enhancement of PDCCH monitoring span in mobile communications in accordance with various implementations of the present disclosure.

In some implementations, apparatus 610 may also include a transceiver 616 coupled to processor 612. Transceiver 616 may be capable of wirelessly transmitting and receiving data. In some implementations, apparatus 620 may also include a transceiver 626 coupled to processor 622. Transceiver 626 may include a transceiver capable of wirelessly transmitting and receiving data.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as a UE, and apparatus 620, as a base station of a serving cell of a wireless network (e.g., 6G/NR mobile network), is provided below. It is noteworthy that, although the example implementations described below are provided in the context of a UE, the same may be implemented in and performed by a base station. Thus, although the following description of example implementations pertains to apparatus 610 as a UE (e.g., UE 110), the same is also applicable to apparatus 620 as a network node or base station such as a gNB, TRP or eNodeB (e.g., network node 125) of a wireless network (e.g., wireless network 120) such as a 6G NR mobile network.

Under a proposed scheme in accordance with the present disclosure, processor 612 of apparatus 610 as a UE (e.g., UE 110) may transmit, via transceiver 616, a report of a per-span based capability of the UE to a network node (e.g., apparatus 620 as network node 125) of a wireless network (e.g., wireless network 120). Additionally, processor 612 may perform, via transceiver 616, PDCCH monitoring using a configuration that satisfies a requirement for a gap separation with respect to spans for at least one candidate value set in the report in every slot including cross-slot boundaries.

In some implementations, in performing the PDCCH monitoring, processor 612 may perform the PDCCH monitoring with a monitoring span for a sub-carrier spacing (SCS) of 15 kHz or 30 kHz.

In some implementations, in transmitting the report, processor 612 may report a plurality of valid configurations associated with a plurality of candidate value sets each represented as (X, Y, M, N), such that: (a) X denotes a minimum number of OFDM symbols between start symbols of every two adjacent spans, (b) Y denotes a length of each span expressed in a number of consecutive OFDM symbols of a slot, (c) M denotes a maximum number of non-overlapping CCEs per monitoring span defined by (X, Y), (d) N denotes a maximum number of BDs per monitoring span defined by (X, Y), and (e) each set of (X, Y) respectively defines multiple values of M, multiple values of N, or multiple values of each of M and N such that two different values of M or N correspond to two different UE capabilities. In such cases, in performing the PDCCH monitoring, processor 612 may select a largest value of M among a set of values of M of the plurality of valid configurations. Moreover, the set of values of M may be RRC-configured or dynamically configured by the network node. Additionally, a set of values of N may be RRC-configured or dynamically configured by the network node.

In some implementations, in transmitting the report, processor 612 may report a plurality of valid configurations associated with a plurality of candidate value sets each represented as (X, Y, index value for M, index value for N), such that: (a) X denotes a minimum number of OFDM symbols between start symbols of every two adjacent spans, (b) Y denotes a length of each span expressed in a number of consecutive OFDM symbols of a slot, (c) the index value for M indicates an index to a first table of a set of values of M, (d) M denotes a maximum number of non-overlapping CCEs per monitoring span defined by (X, Y), (e) the index value for N indicates an index to a second table of a set of values of N, (f) N denotes a maximum number of BDs per monitoring span defined by (X, Y), and (g) each set of (X, Y) respectively defines multiple values of M, multiple values of N, or multiple values of each of M and N such that two different values of M or N correspond to two different UE capabilities. In such cases, in performing the PDCCH monitoring, processor 612 may select a largest value of M among a set of values of M of the plurality of valid configurations. Moreover, the set of values of M may be RRC-configured or dynamically configured by the network node.

In some implementations, in transmitting the report, processor 612 may report a plurality of valid configurations associated with a plurality of candidate value sets each represented as (X, Y, M), such that: (a) X denotes a minimum number of OFDM symbols between start symbols of every two adjacent spans, (b) Y denotes a length of each span expressed in a number of consecutive OFDM symbols of a slot, and (c) M denotes a maximum number of non-overlapping CCEs per monitoring span defined by (X, Y). In such cases, in performing the PDCCH monitoring, processor 612 may select a largest value of M among a set of values of M of the plurality of valid configurations. Moreover, the set of values of M may be RRC-configured or dynamically configured by the network node.

In some implementations, processor 612 may perform additional operations. For instance, processor 612 may receive, via transceiver 616, RRC signaling from the network node (e.g., prior to performing the PDCCH monitoring). In such cases, in the report, processor 612 may also report a per-slot based capability of the UE. Furthermore, the RRC signaling may indicate which of the Rel-15 per-slot based capability and the Rel-16 per-span based capability to apply for the PDCCH monitoring.

Illustrative Processes

Figure 7:
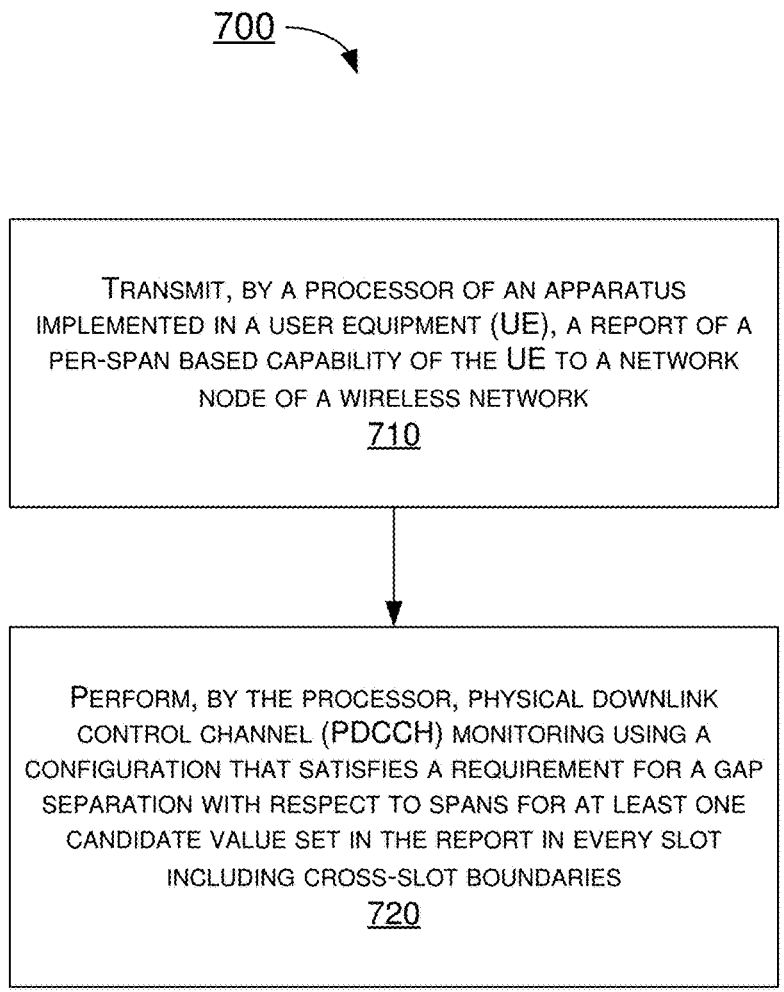
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to enhancement of PDCCH monitoring span in mobile communications in accordance with the present disclosure. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 610 and apparatus 620 as well as any variations thereof. Solely for illustrative purposes and without limiting the scope, process 700 is described below in the context of apparatus 610 as a UE (e.g., UE 110) and apparatus 620 as a network node (e.g., network node 125) of a wireless network (e.g., wireless network 120) such as a 5G/NR mobile network. Process 700 may begin at block 710.

At 710, process 700 may involve processor 612 of apparatus 610 as a UE (e.g., UE 110) transmitting, via transceiver 616, a report of a per-span based capability of the UE to a network node (e.g., apparatus 620 as network node 125) of a wireless network (e.g., wireless network 120). Process 700 may proceed from 710 to 720.

At 720, process 700 may involve processor 612 performing, via transceiver 616, PDCCH monitoring using a configuration that satisfies a requirement for a gap separation with respect to spans for at least one candidate value set in the report in every slot including cross-slot boundaries.

In some implementations, in performing the PDCCH monitoring, process 700 may involve processor 612 performing the PDCCH monitoring with a monitoring span for a sub-carrier spacing (SCS) of 15 kHz or 30 kHz.

In some implementations, in transmitting the report, process 700 may involve processor 612 reporting a plurality of valid configurations associated with a plurality of candidate value sets each represented as (X, Y, M, N), such that: (a) X denotes a minimum number of OFDM symbols between start symbols of every two adjacent spans, (b) Y denotes a length of each span expressed in a number of consecutive OFDM symbols of a slot, (c) M denotes a maximum number of non-overlapping CCEs per monitoring span defined by (X, Y), (d) N denotes a maximum number of BDs per monitoring span defined by (X, Y), and (e) each set of (X, Y) respectively defines multiple values of M, multiple values of N, or multiple values of each of M and N such that two different values of M or N correspond to two different UE capabilities. In such cases, in performing the PDCCH monitoring, process 700 may involve processor 612 selecting a largest value of M among a set of values of M of the plurality of valid configurations. Moreover, the set of values of M may be RRC-configured or dynamically configured by the network node. Additionally, a set of values of N may be RRC-configured or dynamically configured by the network node.

In some implementations, in transmitting the report, process 700 may involve processor 612 reporting a plurality of valid configurations associated with a plurality of candidate value sets each represented as (X, Y, index value for M, index value for N), such that: (a) X denotes a minimum number of OFDM symbols between start symbols of every two adjacent spans, (b) Y denotes a length of each span expressed in a number of consecutive OFDM symbols of a slot, (c) the index value for M indicates an index to a first table of a set of values of M, (d) M denotes a maximum number of non-overlapping CCEs per monitoring span defined by (X, Y), (e) the index value for N indicates an index to a second table of a set of values of N, (f) N denotes a maximum number of BDs per monitoring span defined by (X, Y), and (g) each set of (X, Y) respectively defines multiple values of M, multiple values of N, or multiple values of each of M and N such that two different values of M or N correspond to two different UE capabilities. In such cases, in performing the PDCCH monitoring, process 700 may involve processor 612 selecting a largest value of M among a set of values of M of the plurality of valid configurations. Moreover, the set of values of M may be RRC-configured or dynamically configured by the network node.

In some implementations, in transmitting the report, process 700 may involve processor 612 reporting a plurality of valid configurations associated with a plurality of candidate value sets each represented as (X, Y, M), such that: (a) X denotes a minimum number of OFDM symbols between start symbols of every two adjacent spans, (b) Y denotes a length of each span expressed in a number of consecutive OFDM symbols of a slot, and (c) M denotes a maximum number of non-overlapping CCEs per monitoring span defined by (X, Y). In such cases, in performing the PDCCH monitoring, process 700 may involve processor 612 selecting a largest value of M among a set of values of M of the plurality of valid configurations. Moreover, the set of values of M may be RRC-configured or dynamically configured by the network node.

In some implementations, process 700 may involve processor 612 performing additional operations. For instance, process 700 may involve processor 612 receiving, via transceiver 616, RRC signaling from the network node (e.g., prior to performing the PDCCH monitoring). In such cases, in transmitting the report, process 700 may also involve processor 612 reporting a per-slot based capability of the UE. Furthermore, the RRC signaling may indicate which of the Rel-15 per-slot based capability and the Rel-16 per-span based capability to apply for the PDCCH monitoring.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
selecting, by a processor of an apparatus implemented in a user equipment (UE), a maximum number of non-overlapping control channel elements (CCEs) per monitoring span from a set of possible values;
transmitting, by the processor, a report of a per-span based capability of the UE based on the selecting to a network node of a wireless network; and
performing, by the processor, physical downlink control channel (PDCCH) monitoring using a configuration that satisfies a requirement for a gap separation with respect to spans for at least one candidate value set in the report in every slot including cross-slot boundaries,
wherein the transmitting of the report comprises reporting a plurality of valid configurations associated with a plurality of candidate value sets each represented as (X, Y), and wherein:
X denotes a minimum number of orthogonal frequency-division multiplexing (OFDM) symbols between start symbols of every two adjacent spans, and
Y denotes a length of each span expressed in a number of consecutive OFDM symbols of a slot.

2. The method of claim 1, wherein the performing of the PDCCH monitoring comprises performing the PDCCH monitoring with a monitoring span for a sub-carrier spacing (SCS) of 15 kHz or 30 kHz.

3. The method of claim 1, wherein the performing of the PDCCH monitoring comprises selecting a largest value of M among a set of values of M of the plurality of valid configurations, wherein M denotes the maximum number of non-overlapping CCEs per monitoring span defined by (X, Y), and wherein N denotes a maximum number of blind decodes (BDs) per monitoring span defined by (X, Y).

4. The method of claim 1, further comprising:
receiving, by the processor, RRC signaling from the network node,
wherein the report further reports a per-slot based capability of the UE, and
wherein the RRC signaling indicates which of the per-slot based capability and the per-span based capability to apply for the PDCCH monitoring.

5. An apparatus implementable in a user equipment (UE), comprising:
a transceiver configured to communicate with a network node of a wireless network; and
a processor coupled to the transceiver, the processor configured to perform operations comprising:
selecting a maximum number of non-overlapping control channel elements (CCEs) per monitoring span from a radio resource control (RRC)-configured set of possible values;
transmitting, via the transceiver, a report of a per-span based capability of the UE based on the selecting to the network node; and
performing, via the transceiver, physical downlink control channel (PDCCH) monitoring using a configuration that satisfies a requirement for a gap separation with respect to spans for at least one candidate value set in the report in every slot including cross-slot boundaries,
wherein the transmitting of the report comprises reporting a plurality of valid configurations associated with a plurality of candidate value sets each represented as (X, Y), and wherein:
X denotes a minimum number of orthogonal frequency-division multiplexing (OFDM) symbols between start symbols of every two adjacent spans, and
Y denotes a length of each span expressed in a number of consecutive OFDM symbols of a slot.

6. The apparatus of claim 5, wherein, in performing the PDCCH monitoring, the processor performs the PDCCH monitoring with a monitoring span for a sub-carrier spacing (SCS) of 15 kHz or 30 kHz.

7. The apparatus of claim 5, wherein, in performing the PDCCH monitoring, the processor selects a largest value of M among a set of values of M of the plurality of valid configurations, and wherein a set of values of N is RRC-configured or dynamically configured by the network node, wherein M denotes the maximum number of non-overlapping CCEs per monitoring span defined by (X, Y), and wherein N denotes a maximum number of blind decodes (BDs) per monitoring span defined by (X, Y).

8. The apparatus of claim 5, wherein the processor is further configured to perform operations comprising:
receiving, via the transceiver, RRC signaling from the network node,
wherein, in the report, the processor further reports a per-slot based capability of the UE, and
wherein the RRC signaling indicates which of the per-slot based capability and the per-span based capability to apply for the PDCCH monitoring.

* * * * *